US012808308B2

(12) United States Patent
Day

(10) Patent No.: US 12,808,308 B2
(45) Date of Patent: Nov. 24, 2026

(54) ENERGY GENERATION SYSTEM FOR NON-TRADITIONAL COMBUSTIBLE FLUID SOURCE

(71) Applicant: Trane International Inc., Davidson, NC (US)

(72) Inventor: Michael Sean Day, Sacramento, CA (US)

(73) Assignee: Trane International Inc., Davidson, NC (US)

( * ) Notice: Subject to any disclaimer, the term of this patent is extended or adjusted under 35 U.S.C. 154(b) by 0 days.

(21) Appl. No.: 18/909,274

(22) Filed: Oct. 8, 2024

(65) Prior Publication Data

US 2025/0137389 A1 May 1, 2025

Related U.S. Application Data

(63) Continuation of application No. 18/181,344, filed on Mar. 9, 2023, now Pat. No. 12,110,812, which is a (Continued)

(51) Int. Cl.
*F01K 7/16* (2006.01)
*F01K 15/00* (2006.01)
(Continued)

(52) U.S. Cl.
CPC ................ *F01K 7/16* (2013.01); *F01K 15/00* (2013.01); *F01K 23/065* (2013.01); *F01K 23/10* (2013.01);
(Continued)

(58) Field of Classification Search
CPC ...... F02C 6/14; F02C 6/16; F02C 1/02; F01K 23/10–108; F17C 2265/07; F17C 2270/0581; F17C 5/02–06
See application file for complete search history.

(56) References Cited

U.S. PATENT DOCUMENTS 5,409,045 A 4/1995 Walker et al.
5,409,046 A 4/1995 Swenson et al.
(Continued)

FOREIGN PATENT DOCUMENTS

AU 528830 B 7/1980
EP 2503113 B1 3/2016
(Continued)

OTHER PUBLICATIONS

International Search Report mailed Feb. 8, 2023 in the corresponding International Application No. PCT/IB2022/061289. 6 pages.

*Primary Examiner* — Laert Dounis
(74) *Attorney, Agent, or Firm* — Womble Bond Dickinson (US) LLP

(57) ABSTRACT

Energy generation system for converting combustible fluid from nontraditional combustible fluid source to useable energy. The energy generation system including a fluid storage system including a compressor and at least one storage tank, the compressor configured to pressurize a combustible fluid from a combustible fluid source for storage in the one or more storage tanks; and an energy recovery system configured to receive the combustible fluid from the at least one storage tank, the energy recovery system including: turboexpander configured to depressurize the combustible fluid received from the at least one storage tank; motor-generator configured to input the combustible fluid as depressurized by the turboexpander, and generate electrical energy from the combustible fluid; and organic Rankine cycle (ORC) system configured to generate electrical energy based on a temperature differential between the combustible fluid input to the motor-generator and a waste heat produced by the motor-generator.

11 Claims, 8 Drawing Sheets

Related U.S. Application Data continuation of application No. 17/456,823, filed on Nov. 29, 2021, now Pat. No. 11,643,949.

(51) Int. Cl.

| | |
|---|---|
| ***F01K 23/06*** | (2006.01) |
| ***F01K 23/10*** | (2006.01) |
| ***F02C 1/02*** | (2006.01) |
| ***F02C 6/14*** | (2006.01) |
| ***F17C 5/06*** | (2006.01) |
| ***G05B 13/02*** | (2006.01) |

(52) U.S. Cl.

CPC .................. *F02C 1/02* (2013.01); *F02C 6/14* (2013.01); *F17C 5/06* (2013.01); *G05B 13/02* (2013.01); *F17C 2265/07* (2013.01); *F17C 2270/0581* (2013.01)

(56) References Cited

U.S. PATENT DOCUMENTS

| | | | |
|---|---|---|---|
| 5,685,155 A | 11/1997 | Brown et al. | |
| 5,868,122 A | 2/1999 | Gram et al. | |
| 6,374,591 B1 | 4/2002 | Johnson et al. | |
| 10,240,721 B2 | 3/2019 | Dawson et al. | |
| 11,643,949 B1 * | 5/2023 | Day | F01K 25/10 60/645 |
| 12,110,812 B2 * | 10/2024 | Day | F01K 7/16 |
| 2008/0163645 A1 | 7/2008 | Konishi et al. | |
| 2010/0101231 A1 * | 4/2010 | Westmeier | F25J 3/046 290/52 |
| 2011/0178835 A1 * | 7/2011 | Noureldin | G06Q 10/06313 705/7.23 |
| 2012/0010758 A1 * | 1/2012 | Francino | G05B 17/02 700/291 |
| 2013/0282195 A1 * | 10/2013 | O'Connor | G05B 13/04 700/291 |
| 2014/0096523 A1 | 4/2014 | Coney | |
| 2015/0033792 A1 | 2/2015 | Lissianski et al. | |
| 2016/0248299 A1 * | 8/2016 | Ouvry | H02K 7/1807 |
| 2016/0258363 A1 * | 9/2016 | Tiwari | F02C 9/42 |
| 2017/0130901 A1 * | 5/2017 | Sloan | F17C 5/06 |
| 2019/0338886 A1 | 11/2019 | Santos et al. | |
| 2021/0171376 A1 | 6/2021 | Yochum et al. | |

FOREIGN PATENT DOCUMENTS

| | | | |
|---|---|---|---|
| EP | 3184876 A1 | 6/2017 | |
| JP | S55-148907 A | 11/1980 | |
| JP | H05113108 A | 5/1993 | |
| KR | 20200110719 A * | 9/2020 | H02P 27/06 |
| UA | 55567 U | 12/2010 | |

* cited by examiner

ENERGY GENERATION SYSTEM FOR NON-TRADITIONAL COMBUSTIBLE FLUID SOURCE

CROSS-REFERENCE TO RELATED APPLICATION(S)

This application is a continuation of U.S. patent application Ser. No. 18/181,344, filed on Mar. 9, 2023, entitled ENERGY GENERATION SYSTEM FOR NON-TRADITIONAL COMBUSTIBLE FLUID SOURCE, which is a continuation of U.S. patent application Ser. No. 17/456,823, filed Nov. 29, 2021, entitled ENERGY GENERATION SYSTEM FOR NON-TRADITIONAL COMBUSTIBLE FLUID SOURCE, issued as U.S. Pat. No. 11,643,949 on May 9, 2023. The entire contents of these applications are fully incorporated herein by reference.

TECHNOLOGICAL FIELD

The present disclosure relates generally to an improved energy generation system that generates usable energy from a combustible fluid source, potentially a nontraditional combustible fluid source.

BACKGROUND

There exists various different methods and systems for collecting, storing, and converting energy from combustible fluid sources. In recent years, some systems have been designed to generate energy from nontraditional sources such as landfills or bio-methane sources e.g., digesters. However, to date these systems have several drawbacks and failed to effectively convert the energy collected into usable forms of energy.

Several existing systems focus on converting the energy from these combustibles sources at the same rate in which the combustible fluid is supply by the source. As a result, these systems either ignore or fail to include components for effectively storing combustible fluid that is generated at a low rate over time. Said another way, there exists only a limited number of existing systems directed to continuous low output gas sources (CLOGS), and the systems that do exist failed to include a mechanism for efficiently storing the combustible fluid produced over time.

In addition, these systems fail to include control mechanisms that vary the output of energy produced. Thus, they are often impractical and underutilized, because the existing usable energy supply sources, e.g., the energy grid, are more efficient and cost-effective under standard operating conditions.

In addition, the existing systems associated with CLOGS are often limited to utilizing the chemical energy associated with the gas through combustion alone. As result, additional methods for extracting energy are not utilized.

Thus, there exists a need for an improved energy generation system. One that includes features to take advantage of nontraditional combustible fluid sources, and optimize their operation to complement existing energy sources such as utility grids.

BRIEF SUMMARY

Example implementations of the present disclosure provide an energy generation system that convers energy in the form of a combustible fluid into useable energy, e.g., electricity, purified natural gas, etc. The energy generation system receives combustible fluid from a fluid source and stores the fluid efficiently in various storage tanks. The energy generation system may then convert the energy in the combustible fluid into other forms of energy that may be utilized outside the system. In particular, the disclosed energy generation system herein may use multiple different devices, engines, and thermodynamic cycles, to extract electrical energy from the combustible fluid in various different ways. In addition, in some examples, the system may also produce purified forms of the combustible fluid that may be provided outside the system.

The disclosed energy generation system may also selectively operate components and/or systems to take it advantage of energy pricing. For example, the system may store the combustible fluid when energy prices are low. In some examples, the system may also pressurize combustible fluid in the storage tank(s), further storing energy, while the energy prices are low. Then, when energy prices are higher, the system may extract the energy from the combustible fluid.

The present disclosure thus includes, without limitation, the following example implementations.

Some example implementations include an energy generation system comprising a fluid storage system including a compressor and at least one storage tank, the compressor configured to pressurize a combustible fluid from a combustible fluid source for storage in the one or more storage tanks; and an energy recovery system configured to receive the combustible fluid from the at least one storage tank, the energy recovery system including: a turboexpander configured to depressurize the combustible fluid received from the at least one storage tank; a motor-generator configured to input the combustible fluid as depressurized by the turboexpander, and generate electrical energy from the combustible fluid; and an organic Rankine cycle (ORC) system configured to generate electrical energy based on a temperature differential between the combustible fluid input to the motor-generator and a waste heat produced by the motor-generator.

Some example implementations include a method of generating energy, the method comprising: pressurizing a combustible fluid from a combustible fluid source for storage in at least one storage tank; receiving the combustible fluid from the at least one storage tank at a turboexpander; depressurizing the combustible fluid from the at least one storage tank at the turboexpander; combusting the depressurized combustible fluid at a motor-generator to produce electrical energy; and generating electrical energy using an organic Rankine cycle (ORC) system based on a temperature differential between the depressurized combustible fluid inputted into the motor-generator and a waste heat produced by the motor-generator during combustion.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Figure 1:
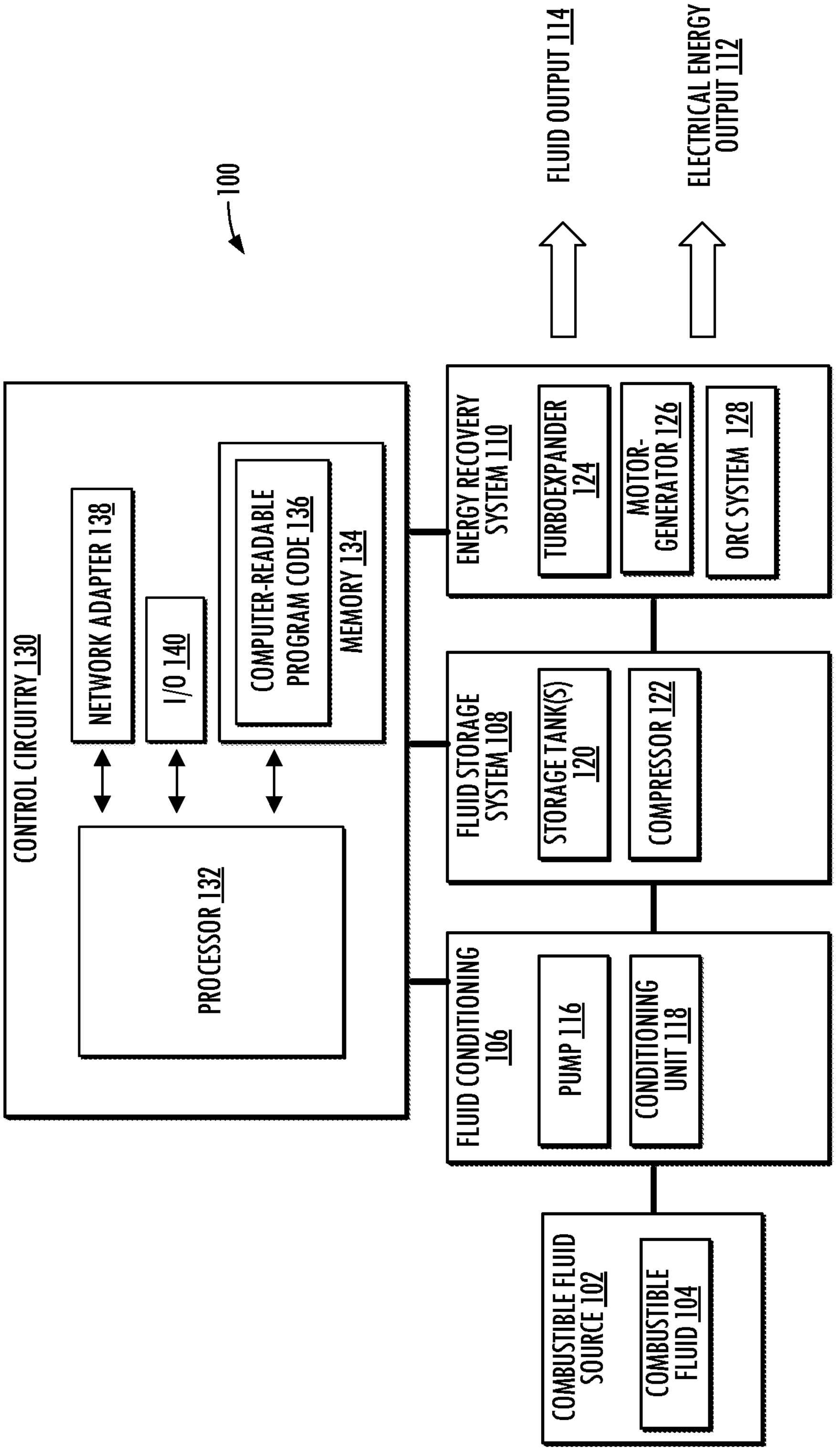
FIG. 1 is a block diagram of the energy generation system according to some example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," "observation" and similar terms may be at times used interchangeably.

Example implementations of the present disclosure provide an energy generation system that convers energy in the form of a combustible fluid into electricity, and in some examples purified forms of the combustible fluid. The energy generation system receives combustible fluid from a fluid source and stores the fluid efficiently in various storage tanks. The energy generation system may then convert the energy in the combustible fluid into other forms of energy that may be utilized outside the system. For example, the disclosed energy generation system herein may use multiple different devices, engines, and thermodynamic cycles, to extract electrical energy from the combustible fluid in various different ways. In addition, in some examples, the system may also produce purified forms of the combustible fluid that may be provided outside the system.

The disclosed energy generation system may also selectively operate components and/or systems to take it advantage of energy pricing. For example, the system may store the combustible fluid when energy prices are low. In some examples, the system may also pressurize combustible fluid in the storage tank(s), further storing energy, while the energy prices are low. Then, when energy prices are higher, the system may extract the energy from the combustible fluid.

The disclosed energy generation system may be particularly applicable to converting energy from continuous low output gas sources (CLOGS) such as landfills and biomethane sources, e.g. digesters. However, it is also applicable to a broad range of combustible fluid sources.

FIG. 1 is a block diagram of the energy generation system 100 according to some example implementations of the present disclosure. This system includes a combustible fluid source 102, which provides combustible fluid 104. A fluid conditioning unit 106 may be used to move and condition the combustible fluid from the combustible fluid source to the fluid storage system 108. The fluid storage system may store the energy associated with the combustible fluid, and in some examples, it may also pressurize the combustible fluid, generating additional potential energy in the form of stored pressure.

The energy recovery system 110 converts the stored energy in the combustible fluid into various usable energy forms that may be utilized by the energy generation system itself, or provided outside the system. For example, the energy generation system may provide electrical energy output 112 and/or fluid output 114 outside the system. The examples provided herein discuss electrical energy output and/or energy output from a fluid source, e.g., purified combustion fluid, however, the disclosed system may also be used to produce mechanical energy. For example, the described systems may provide mechanical energy in the form of rotational forces provided by the various turbines, motors, and engines described below. In some examples, the mechanical energy generated may be used to power a pump or other mechanical device instead of, or in addition to, using the mechanical energy to generate electrical energy.

The combustible fluid source 102 may be any source of combustible fluid, e.g., natural gas reserve, pipeline, heating oil tank, etc. Similarly, the combustible fluid 104 may be any fluid capable of combusting, e.g., oil, natural gas, etc. As discussed above, the energy generation system 100 may be particularly advantageous when used with CLOGS because the disclosed system is able to aggregate the combustible fluid produced over a longer period of time. The system is then able to provide energy aggregated over this period of time when energy demands are high and/or energy prices are high. In addition, in some examples, the system is able to take advantage of various controls features to increase the energy in the storage system, which in some instances allows the system to discharge a higher power level during discharge.

The combustible fluid 104 may be provided from the combustible fluid source 102 in a variety of different ways. In some examples, a pump 116 is used to move combustible fluid to the fluid storage system 108. The combustible fluid may be directed by fluid pipe from combustible fluid source, and in these examples, the pump may be coupled to the fluid pipe. Some examples include a conditioning unit 118 that removes various impurities from the combustible fluid. For example, the combustible fluid may be raw natural gas, and the conditioning unit may remove sulfur, water, and other impurities associated with the raw natural gas collected at the combustible fluid source. Any conventional conditioning device may be used, and in some examples, multiple different devices are used to condition the combustible fluid prior to entering the fluid storage system.

The fluid storage system 108 stores the combustible fluid 104 in at least one storage tanks 120. In some examples, the pump 118 moves the combustible fluid into the storage tanks, and in some examples, the pump pressurizes the combustible fluid in some or all of the storage tanks. The fluid storage system 108 may also include a compressor 122. The compressor may pressurize the combustible fluid in one or more of the storage tanks, and often the compressor pressurizes the combustible fluid to a higher pressure than the pressure provided by the pump. In some examples, the compressor moves the combustible fluid between the storage tanks, at times, moving the combustible fluid from a storage tank at a given pressure level to another storage tank at a higher pressure level.

The energy recovery system 110 may receive the combustible fluid 104 from at least one of the fluid storage tanks 116 and convert the energy in the combustible fluid for use outside the system. The energy provided by the energy recovery system may be in the form of an electrical energy output 112 and/or fluid output 114.

In some examples, the energy recovery system 110 includes a turboexpander 124 that receives the combustible fluid from the fluid storage system 108. The turboexpander may depressurize the combustible fluid, and this depressurization process may cool the combustible fluid. In addition, in some examples, the depressurization process performed by the turboexpander may generate electrical energy and/or purified methane. The purified methane may be provided outside the system in the form of the fluid output 114.

The energy recovery system 110 may also include a motor-generator 126 that inputs the combustible fluid 104, typically after combustible fluid has been depressurized by the turboexpander 124. The motor-generator combusts the combustible fluid and uses the combustion process to generate electrical energy. This electrical energy may be provided outside the system as part of the electrical energy output 112. The combustion process at the motor-generator also may produce additional combustion by-products including waste heat. These combustion by-products may be routed away from the motor-generator via an exhaust flue, and the energy generation system 100 may recover some of the energy from the waste heat.

The energy recovery system 110 may also include an organic Rankine cycle (ORC) system 128 that generates electrical energy based on a temperature differential created by various components within the system. In some examples, the ORC system uses the cold depressurized combustion input to the motor-generator as a low temperature heat sink. The ORC system may also use the hot waste heat produced by the motor-generator as a high temperature heat source. The ORC system may generate electrical energy by cycling a working fluid between a high and low temperature using the temperature differential between waste heat and/or the combustion fluid input. The electrical energy generated may be provided outside the system as part of the electrical energy output 112.

The energy generation system 100 in FIG. 1 includes control circuitry 130 operably coupled with the fluid conditioning unit 106, the fluid storage system 108, and the energy recovery system 110. The control circuitry is configured to control these components and the devices associated with them. For example, as discussed more below, the control circuitry may selectively control these components to take advantage of utility prices and/or optimize the performance of the system. In some examples, the control circuitry is also coupled to the energy grid, potentially a grid operator, and in some examples, the control circuitry is also coupled to additional energy generators.

The control circuitry may include one or more of each of a number of components such as, for example, a processor 132 connected to a memory 134. The processor is generally any piece of computer hardware capable of processing information such as, for example, data, computer programs and/or other suitable electronic information. The processor may be configured to execute computer programs such as computer-readable program code 136, which may be stored onboard the processor or otherwise stored in the memory.

The memory 134 may generally be any piece of computer hardware capable of storing information, such as, for example, data, computer-readable program code 136 or other computer programs, and/or other suitable information either on a temporary basis and/or a permanent basis. The memory may include volatile memory such as random access memory (RAM), and/or non-volatile memory such as a hard drive, flash memory or the like. In addition to the memory, the processor 132 may also be connected to one or more peripherals such as a network adapter 138, one or more input/output (I/O) devices 140, or the like. The network adapter is a hardware component configured to connect the control circuitry 130 to a computer network to enable the control circuitry to transmit and/or receive information via the computer network.

Figure 2:
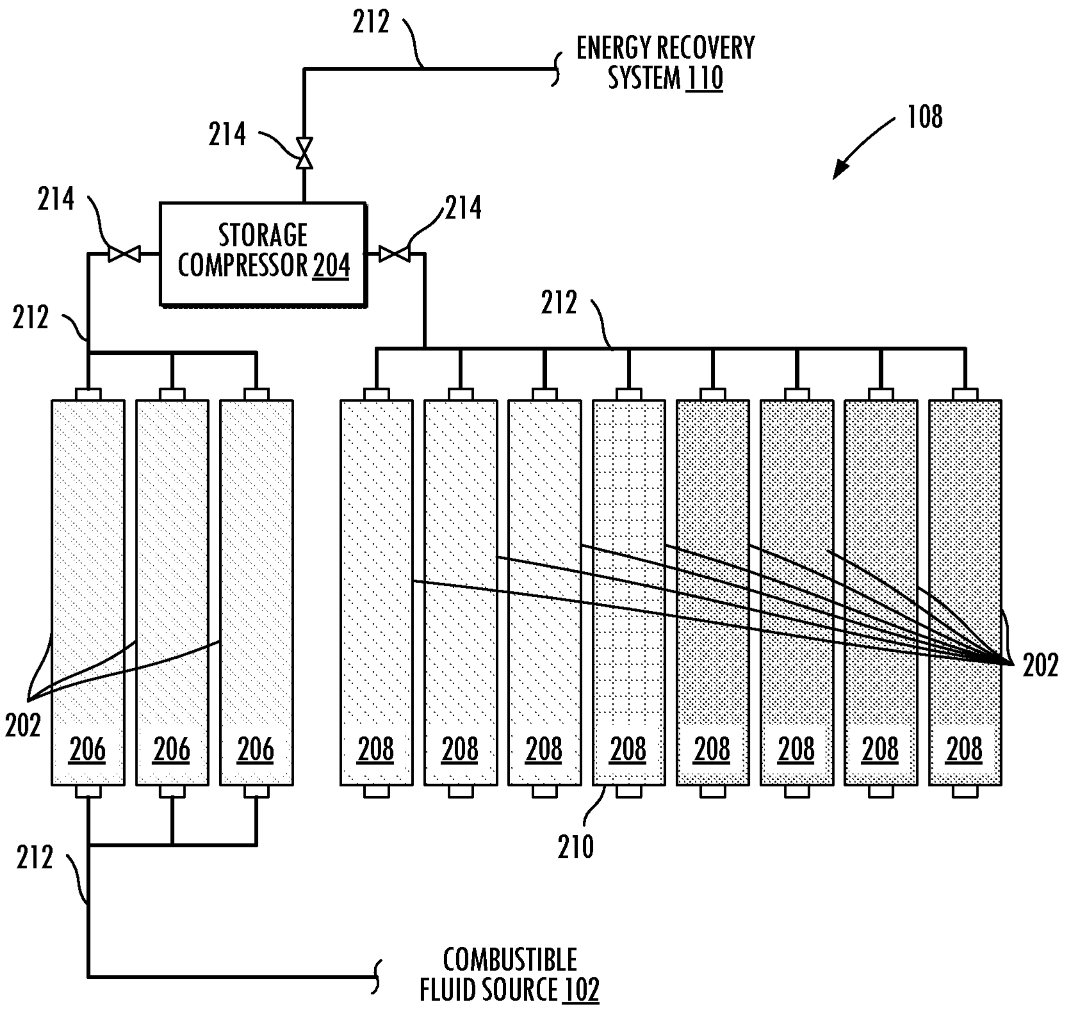
FIG. 2 is a diagram of the fluid storage system according to some example implementations of the present disclosure.

FIG. 2 shows an illustration of an example fluid storage system 108 that may be used to store the combustible fluid 104 from the combustible fluid source 102. The fluid storage system may include one or more fluid storage tanks 202 and a compressor 204. The fluid storage tanks may receive and store the combustible fluid from the combustible fluid source. The compressor may be used to charge the combustible fluid within the storage tank, and in some examples, increase the stored energy associated with the combustible fluid within the storage tank(s). When energy is requested from the system the fluid storage system may provide the combustible fluid to the energy recovery system 110 to be converted into usable energy.

The example depicted in FIG. 2 is a cascade system and includes multiple fluid storage tanks 202. In this example, the fluid storage system 108 includes one or more low-pressure storage tanks 206 that receives combustible fluid 104 from the combustible fluid source 102. The fluid storage system may also include one or more high-pressure storage tanks 208. In some examples, an intermediate pressure storage tank 210 is also included, which may be one of the high-pressure storage tanks.

In some examples, the pump 116 (shown in FIG. 1) moves the combustible fluid 104 to the fluid storage system 108 for storage in at least one storage tank at a first pressure. In some examples, the low-pressure storage tanks 206 are the storage tanks that receive the combustible fluid from the pump. The pump may provide the pressurization of the combustible fluid in these storage tanks.

In some examples, the compressor 204 pressurizes the combustible fluid 104 from the first at least one storage tank to at least one second pressure for storage in the second at least one storage tank. In some examples, the at least one second storage tank is a plurality of second storage tanks, and the at least one second pressure is a plurality of second pressures. In these examples, the compressor may pressurize the combustible fluid to the plurality of second pressures for storage in different ones of the plurality of second storage tanks.

In these examples, the compressor 204 may be used to move the combustible fluid 104 in to the storage tanks in a variety of different ways. For example, this process may include using the compressor to move the combustible fluid from the low-pressure storage tank(s) 206 in to the high-pressure-storage tanks 208. The compressor may also pressurize the combustible fluid in the high-pressure storage tanks to a storage pressure. The storage pressure may be higher than the pressure maintained in the low-pressure tanks. In some examples, the storage pressure is the highest pressure the combustible fluid is maintained at in the fluid storage system 108, and in some examples, it is the highest pressure the combustible fluid is maintained at in the entire system 100.

In some of examples, the fluid storage system 108 includes two or more high-pressure storage tanks 208. The compressor 204 may pressurize the combustible fluid 104 in these high-pressure storage tanks in different ways. For example, the compressor may compress the combustible fluid in a first high-pressure storage tank to a first pressure, potentially the storage pressure, before moving (and pressurizing) fluid in any other high-pressure storage tank. Once the first high-pressure storage tank is fully pressurized, the compressor may then move combustible fluid into a second high-pressure storage tank, and again, continue to pressurize the combustible fluid in the second high-pressure storage tank until that tank is fully pressurized. This process may continue, fully pressurizing each high-pressurized storage tank until all the combustible fluid is stored or all the tanks are full.

In some examples, the final high-pressure storage tank to receive combustible fluid 104 may be pressurized to an intermediate pressure. This may be a result of the total volume of combustible fluid available, e.g., the combustible fluid is fully stored at that time and there is insufficient combustible fluid to pressurize the final high-pressure storage tank to storage pressure. In these examples, that final storage tank would be considered the intermediate pressure storage tanks 210. In these examples, the high-pressure storage tanks may contain combustible fluid at two (or three) different pressures. The fully filled high pressure storage tank(s) 208 will maintain the combustible fluid at storage pressure, the high-pressure. The final storage tank filled will maintain the combustible fluid at an intermediate pressure, and any remaining storage tanks will be empty. In some examples, each of these pressure levels in the high-pressure storage tanks are different from the pressure maintained at the low-pressure storage tanks. In some examples, the compressor 204 may evenly distribute the combustible fluid 104 across the high-pressure storage tanks. In some examples, the compressor creates a vacuum at the low-pressure tank(s) 206 by removing all, or substantially all, the combustible fluid (and other fluid) from those tanks.

The compressor 204 may be any standard compressor. The compressor may also be designed to cycle to maximize energy efficiency. In some examples, during each operation cycle the compressor moves all, or substantially all, of the combustible fluid 104 to the high-pressure storage tanks 208. This may include moving all the combustible fluid from the low-pressure storage tank(s) 206 and/or any combustible fluid generated by the combustible fluid source 102 during the cycle.

In some examples, the compressor 204 is coupled to a solar energy source, potentially a photovoltaic system, that provides energy to the compressor. The energy provided by the solar energy source may be store, and in some examples, the compressor operates when the stored energy is above a threshold level. In some examples, the compressor operates when the energy provided by the solar energy source is sufficient to run the compressor. The compressor may also be coupled to other components of the system, e.g., the turboexpander 124, motor-generator 126, ORC system 128, etc., and receive energy from these components. In some examples, the compressor may be powered using a combustible fluid, potentially from the energy storage system.

The fluid storage system 108 may also provide the combustible fluid 104 to the energy recovery system 110. In some examples, the pressure differential between a first pressure and at least one second pressure causes movement of the combustible fluid from the second at least one storage tank toward the energy recovery system. In these examples, the high-pressure storage tanks 208 may include one or more storage tanks at a high pressure, potentially the storage pressure. The low-pressure storage tanks 206 may be maintained at a different lower pressure. To move the combustible fluid, the fluid storage tank may first arrange the system such that the energy recovery system is fluidly coupled to the low pressure storage tank(s) and closed off from the high pressure storage tanks. The low pressure tanks may be used to lower the line pressure of any conduit or piping that routes the combustible fluid to (and through) the energy recovery system. Once the line pressure associated with the energy recovery system has been lowered, the fluid connection between the energy recovery system and the low pressure tank(s) are closed in order to maintain the low line pressure.

In these examples, the energy recovery system 110 may then be fluidly coupled to the high-pressure storage tank(s) 208. In some examples, the high-pressure storage tanks are fluidly arranged during this operation such that the energy storage system is only coupled to a single high-pressure storage tank at a given time, potentially one where the combustible fluid is maintained at a high pressure, potentially the storage pressure. Because the high-pressure storage tanks contain combustion fluid at a pressure higher than the low-pressure storage tanks, the pressure differential from these tanks will direct the combustible fluid to the energy recovery system. The energy recovery system may receive combustible fluid from the high-pressure storage tank until the combustible fluid is fully discharged from that tank and/or the pressure of the combustible fluid in that tank is too low to directed combustible fluid to the energy recovery system. If more combustible fluid is still requested, the energy recovery system may be connected to another high-pressure storage tank to receive combustible fluid. This process may continue until the energy demands have been satisfied and/or the combustible fluid is depleted.

In some examples, the high-pressure storage tanks are sufficiently charged, or the pressure differential is sufficiently great, that the combustible fluid flows through the energy recovery unit without needing to operate the compressor or any other component requiring power. In some examples, the storage pressure maintained in one or more of the high-pressure storage tanks 208 is sufficiently high to move the combustible fluid from a given high-pressure storage tank to the energy recovery system without needing to utilize the low-pressure tanks 206. In some examples, the compressor operates to aid and/or facilitate the movement of combustible fluid between the fluid storage system 108 and the energy recovery system 110. Other methods and techniques may also be used to move the combustible fluid from the fluid storage system to the energy recovery system.

After the energy recovery system 110 has sufficiently received combustion fluid 104 at a given time, the compressor 204 may operate to move the combustion fluid between the various storage tank(s) to efficiently store the combustion fluid. For example, if more than one high-pressure storage tank 208 includes combustible fluid at a pressure level lower than the storage pressure, e.g., there are more than one high-pressure storage tank at an intermediate pressure, the compressor may aggregate the combustible within these tanks such that there is only a single storage tank at intermediate pressure. For example, the compressor may first move the combustible fluid in these storage tanks to a first storage tank at intermediate pressure until that first storage tank reaches storage pressure or the other tanks at intermediate pressure are empty. If there are still storage tanks at intermediate pressure, the compressor may then direct the combustible fluid in the remaining storage tanks with intermediate pressure to a second storage tank. This process may continue until the high-pressure storage tanks again have storage tanks at only two (or three) pressure levels-storage tanks at storage pressure, one storage tank at intermediate pressure, and/or storage tanks without combustible fluid. This system may also be set up similar with additional pressure levels.

It is understood that that fluid connections and valves discussed above can be accomplished by a variety of modulating value arrangements, piping connections, compressor designs, controls, etc. The arrangement shown in FIG. 2 of fluid lines 212 and modulating valves 214 is only one illustrative example.

Figure 3A:
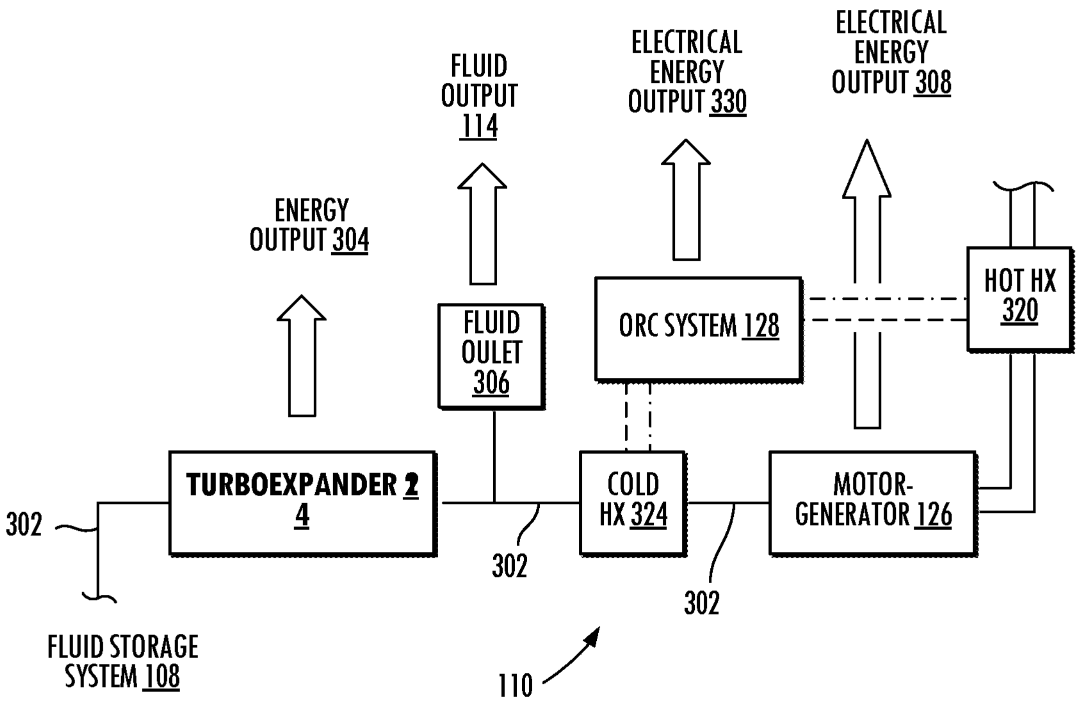
FIG. 3A is a diagram of the energy generation system according to some example implementations of the present disclosure.

FIG. 3A shows an illustration of an example energy recovery system 110. The energy recovery system may receive combustible fluid 104 from the fluid storage system 108 and convert the energy stored in the combustible fluid into other usable forms of energy such as electrical energy or purified gas. These other forms of energy may be utilized within the system 100 or provided outside the system for use by connected devices or systems.

In the depicted example, the energy recovery system 110 includes a turboexpander 124, a motor-generator 126, and an organic Rankine (ORC) system 128. The combustible fluid 104 is routed between these devices using a piping network 302. These various devices include additional components, which will be discussed in greater detail below, and each of these devices is capable of generating electrical energy from the combustible fluid 104 provide by fluid storage system 108. It is understood that the energy recovery system may include more or less devices and components than shown in FIG. 3A.

In some examples, the turboexpander 124 receives the combustible fluid 104 from the fluid storage system 108 and depressurizes the combustible fluid. The combustible fluid may be provided at an elevated pressure, which may be the result of the compressor 204 pressurizing the combustible fluid within the fluid storage system. The turboexpander may utilize the depressurization process to generate electrical energy. The depressurization process may also allow for additional benefits. For example, it may cool the combustible fluid to a low temperature. This cooling process may purify the combustible fluid, for example, by allowing fractional distillation. In addition, the low temperature combustible fluid exiting the turboexpander may improve the efficiency of the motor-generator 126 and/or provide a heat sink for the ORC system 128. These various processes and benefits will be discussed more below.

The turboexpander 124 used in the energy generation system 100 may be any standard turboexpander device. It may utilize the high-pressure combustible fluid 104 entering the turboexpander to generate mechanical forces through depressurization, and the mechanical forces may be used to generate energy. For example, the turboexpander may be an expansion turbine that uses the high-pressure fluid to rotate a turbine shaft. The turbine shaft may itself generate a mechanical energy output, or in some examples, the turbine shaft be connected to an electrical generator that uses the rotational motion to generate electrical energy. The energy generated may be provided outside the system as a turboexpander energy output 304. This energy output 304 may be utilized within the system 100, or provided as an energy output outside the system.

The depressurizing process within the turboexpander 124 may also cool the combustible fluid. This may result from the standard cooling process that occurs when a fluid gas expands, which lowers the temperature of the gas. The cooling process may also be increased and/or controlled by operating turboexpander in an adiabatic or substantially adiabatic manner. In some examples, this cooling process decreases the temperature of the combustible fluid substantially.

In some examples, the combustible fluid 104 is natural gas, potentially raw natural gas which may have been conditioned by a conditioning unit 118. In some examples the combustible fluid includes bio-methane which may be made up of methane and various non-methane impurities, e.g., carbon dioxide ($CO2$), water ($H2O$), etc. The cooling process that occurs at the turboexpander 124 may condense some or all of the non-methane impurities, allowing a purified form of methane to be produced. In some examples, the cooling process condenses the methane as well, and purified methane may be extracted using the distillation process. This distillation process may be a fractional distillation that uses a Linde process.

In some examples, the energy recovery system 110 further includes a fluid outlet 306 that diverts purified methane away from the motor-generator 126, e.g., before the methane is combusted. In the example depicted in FIG. 3A, the methane outlet is located near the outlet of the turboexpander 124 and coupled to the piping network 302 immediately after the turboexpander. In some examples, the turboexpander includes this methane outlet. In other examples, the outlet is located further downstream in the piping network. In these examples, the methane outlet may provide the purified methane outside the system as a fluid output 114. In some examples, the system delivers only a portion of the methane from the piping network to the methane outlet, and the remaining methane is routed to the motor-generator 126.

In some examples, the motor-generator 126 may input the depressurized combustible fluid 104 from the turboexpander 124 to generate electrical energy. The motor-generator may combust the combustible fluid and convert the energy from this combustion into motor-generator electrical energy output 308 that may be utilized within the system 100, or provided as an electrical energy output 112 outside the system. Some embodiments may use other devices for generating electrical energy from the combustible fluid, for example, a fuel cell may be used.

Figure 3B:
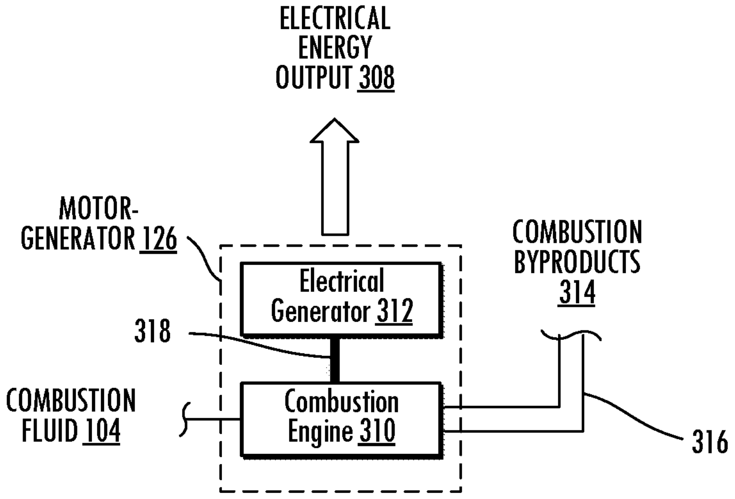
FIG. 3B is a diagram of the motor-generator according to some example implementations of the present disclosure.

FIG. 3B shows an example diagram of components that may be including within the motor-generator 126. In the depicted example, motor-generator include a combustion engine 310 coupled to electrical generator 312.

The combustion engine 310 may be any standard combustion engine, e.g., a gas turbine, an internal combustion engine, etc., that combust the combustion fluid 104 to generate mechanical energy and combustion byproducts 314. The combustion byproducts may include waste heat which is generated during the combustion process. In some examples, the combustion engine includes an exhaust flue 316 that directs the combustion byproducts away from the motor-generator, and potentially away from other components of the system 100.

In the example depicted in FIG. 3B the combustion engine 310 also includes a drive shaft 318 that receives the mechanical energy generated by the combustion engine. In the depicted example, the drive shaft is coupled to the electrical generator 312, which receives the mechanical energy and converts it into electrical energy output 318. Any standard electrical generator may be used. The electrical energy generated at the electrical generator may be the motor-generator electrical energy output 308. In some examples, that energy output 308 is provided as the electrical energy output 112 outside the system.

Figure 3C:
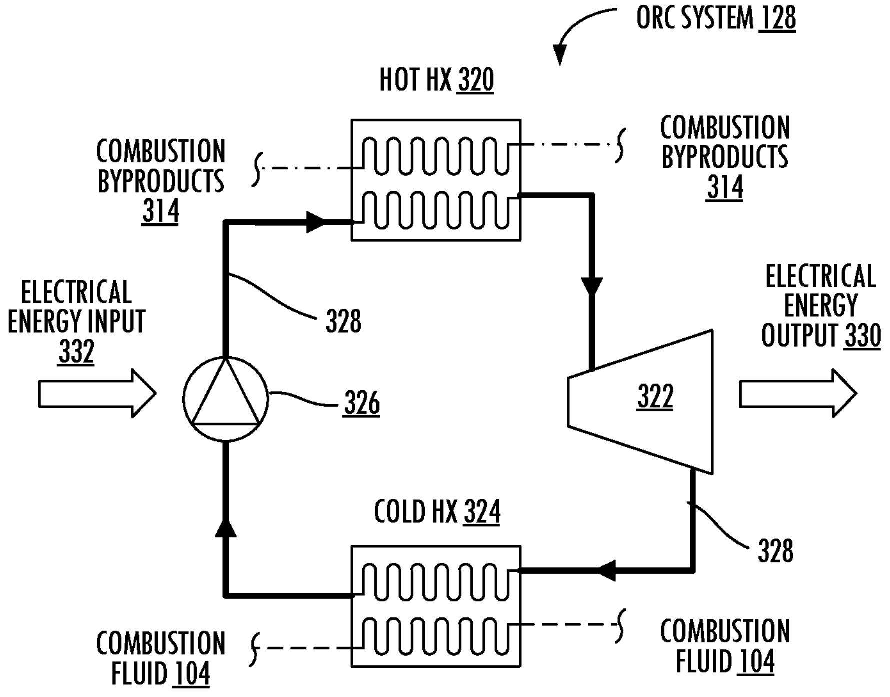
FIG. 3C is a diagram of the organic Rankine cycle system according to some example implementations of the present disclosure.

FIG. 3C shows an example diagram of the ORC system 128 that may be part of the energy recovery system 110. The ORC system may generate a net electrical energy output based on a temperature differential between the combustible fluid input to the motor-generator and a waste heat produced by the motor-generator.

In the example depicted in FIG. 3C the ORC system includes a hot-side heat exchanger 320, a turbine 322, a cold-side heat exchanger 324, a pump 326, and a working fluid 328. The working fluid cycles between high and low temperatures to generate an electrical energy output 330. In some examples, the cold depressurized combustion fluid 104 input to the motor-generator 126 provides the heat sink lowering the temperature of the working fluid. In some examples, the waste heat associated with the combustion byproducts 314 provides a heat source elevating the temperature of working fluid. The ORC utilizes the heat sink and/or the heat source to generate net electrical energy output.

To walk through these components in more detail, the working fluid 328 may cycle within a closed-circuit within the ORC system 128. The pump 326 may pressurize the working fluid to circulate the fluid within the closed-circuit. An energy input, typically electrical energy input 332, is required to drive the pump and circulate the working fluid. This energy input may be provided by one of the components previously discussed, e.g., the turboexpander 124, motor-generator 126, the ORC system 128, or from a separate energy source. In some examples a compressor is used instead of the pump, and operates in a similar manner.

The pressurized working fluid 328 may then be routed to a hot-side heat exchanger 320, which transfers heat to the working fluid. The hot-side heat exchanger may be coupled to a separate heat source, often a separate fluid flow, and transfers heat between these fluid flows. The hot-side heat exchanger transfers heat from the heat source to working fluid. This heat transfer increases the temperature of the working fluid and/or causes the working fluid to evaporate.

In some examples, the hot-side heat exchanger 320 uses the waste heat associated with the motor-generator 126 as the heat source. The hot-side heat exchanger may be coupled to the exhaust flue 316, and it may use the fluid flow of the combustion byproducts 314, as a separate fluid flow into the heat exchanger. In these examples, some or all of the waste heat in the combustion byproducts may be transferred to the working fluid at the hot-side heat exchanger.

The working fluid 328 may then be routed to a turbine 322 or other device that generate an electrical energy output 330 by depressurizing the working fluid. This electrical energy may be utilized within the system, or provided as the provided as an electrical energy output 112 outside the system.

The depressurized working fluid 328 may then be routed to a cold-side heat exchanger 324, which transfers heat from the working fluid, and transfers heat between these fluid flows. The cold-side heat exchanger may be coupled to a separate heat sink, often a separate fluid flow. The cold-side heat exchanger transfers heat from the working fluid to the heat sink. This heat transfer decreases the temperature of the working fluid and/or causes the working fluid to condense.

In some examples, the cold-side heat exchanger 324 uses the cold depressurized combustion fluid 104 from the turboexpander 124 as the heat sink. The cold-side heat exchanger may be coupled to the combustion fluid 104 input to the motor-generator 126, and it may use the combustion fluid flow as a separate fluid flow into the heat exchanger.

In some examples, the ORC system 128 is controlled to ensure the temperature differential is sufficient to ensure a net energy output as discussed more below.

As shown in FIG. 1, the control circuitry 130 may be operatively coupled to the fluid storage conditioning unit 106, the fluid storage system 108, and/or the energy recovery system 110 as well as the various devices and components associated therewith. In some examples, it is advantageous to control the components of the system 100 to take advantage of various energy pricing. For example, and as discussed above, the system disclosed herein may be particularly useful when associated with combustible fluid sources that provide a low rate of combustible fluid output over a long time, e.g., CLOGS. By aggregating the combustible fluid over a period of time and then converting it to usable energy outside the system selectively, a more efficient energy generation system may be achieved. In addition, these devices may be controlled to optimize the operation of the system or system components at a given time, or again, over a period of time.

In some examples, the control circuitry 130 controls the fluid storage system 108 to storage of the combustible fluid 104 when an energy price is below a first threshold value. The control circuitry may also control the energy recovery system 110 to generate the output electrical energy 112 and/or the output gas energy 114 when the energy price is above a second threshold value. In some of these examples, the energy price is a price of electrical or natural gas, potentially the price provided by a utility company or electric market seller.

The pricing information may be associated with the utility company that provides energy where the energy generation system 100 is located, and the control circuitry 130 may receive this pricing information. For example, the control circuitry may be connected to a network, e.g., the Internet, local area network, etc., that regularly publishes energy pricing information. In some examples, pricing information is loaded and stored within the control circuitry, and this information may be regularly refreshed. In some examples, the pricing information is inputted manually. Other methods for receiving this information may also be used.

The control circuitry 130 may also receive and/or store pricing threshold values. The control circuitry may include two or more pricing threshold values. In some examples, the two or more pricing threshold values are the same, in some examples, these values are different. In some examples, these values change over time. In some examples, one of threshold values, potentially the first threshold value, represents a price associated with the normal or expected energy price. This first threshold value may be an average energy price or a median energy price. In some examples, this first threshold value may be an energy price lower than the average energy price. Another threshold value, potentially a second threshold value, may represent a price that is above the normal expected energy price. For example, this second threshold value may be a value above the average energy price, or median energy price. In some examples, it may represent a peak energy price.

In some examples, the control circuitry 130 controls the energy generation system 100 to operate various components within the system to store combustible fluid when the price of energy is equal to or below the first threshold value. For example, the control circuitry may operate the compressor 122 to pressurize the combustible fluid within the storage tank at this time, taking advantage of this energy price. In some examples, the control circuitry operates the pump 116 and/or the conditioning unit 118 at this time.

In some examples, the control circuitry 130 controls the energy generation system 100 to generate energy from the combustible fluid 104 and provide energy outside the system when the price of energy is above a threshold value. This threshold value may be the same as the first threshold value, or it may be a different value, potentially the second threshold value, which may be higher than the first threshold value. In these examples, the control circuitry may operate the energy recovery system 110 to generate energy. The control circuitry may control the fluid storage system 108 to supply combustible fluid to the energy generation system, which may operate the turboexpander 124, the motor-generator 126, and/or the ORC system 128 to generate an electrical energy output 112.

In some examples, the control circuitry 130 may also selectively provide fluid output 114 based on the price of energy. In these examples, the control circuitry may compare the price of electrical energy to the price of natural gas at a given time. In some examples, this comparison is a relative comparison, where the price of natural gas at a given time is compared with its average or typical price to determine a relative value of natural gas at that time. A similar relative value of electrical energy may also be determined by comparing the price electrical energy at a given time to average or typical price for electrical energy. Once the relative values are determined, the control circuitry may compare them to determine which price is higher relative to their standard value at that time. If it is determined that the price of natural gas is higher than the price of electrical energy, either by a relative or absolute standard, the control circuitry may control energy generation system 100 to provide fluid output 114 instead of electrical energy output 112.

In these examples, the control circuitry 130 may control the turboexpander 124 to provide purified methane. The control circuitry may also turn off, or choose not to operate, the motor-generator 126 and/or the ORC system 128. The control circuitry may also actuate valves to ensure the combustible fluid, which includes the purified methane, is routed to the fluid outlet 306 and away from the motor-generator.

The control circuitry 130 may also control various components within the energy generation system 100 to optimize performance. For example, control circuitry may control the ORC system 128 to ensure the temperature differential is sufficient to provide a net energy output. For example, the system 100 may store efficiency information that provides an indication of the energy output 330 and the energy input 332 for the ORC system at various different temperature differentials. The control circuitry may monitor the temperature at the heat source and/or the heat sink associated with the ORC system to determine whether the temperature differential is sufficient to generate an energy output that is greater than the energy input. In some examples, this includes utilizing a temperature sensor added the hot-side heat exchanger 320 and/or the cold-side heat exchanger 324.

In some examples, the control circuitry 130 only utilizes the temperature from one of either the heat source, e.g., the hot-side heat exchanger 320, or the heat sink, e.g., the cold-side heat exchanger 324. In these examples, the control circuitry operates the ORC system 128 if the temperature of the heat source is sufficiently high, e.g., above a given temperature value, or if the temperature of the heat sink is sufficiently low, e.g., below a given valve.

FIGS. 4A-4L are flowcharts illustrating various steps in a method 400 of generating energy from a combustible fluid source 102, according to various example implementations of the present disclosure. The method includes pressurizing a combustible fluid 104 from the combustible fluid source for storage in at least one storage tank 120, as shown at block 402 of FIG. 4A. The method includes receiving the combustible fluid from the at least one storage tank at a turboexpander 124, as shown at block 404. The method includes depressurizing the combustible fluid from the at least one storage tank at the turboexpander, as shown at block 406. The method includes combusting the depressurized combustible fluid at a motor-generator 126 to produce electrical energy, as shown at block 408. And the method includes generating electrical energy using an ORC system 128 based on a temperature differential between the depressurized combustible fluid inputted into the motor-generator and a waste heat produced by the motor-generator during combustion, as shown at block 410.

Figure 4A:
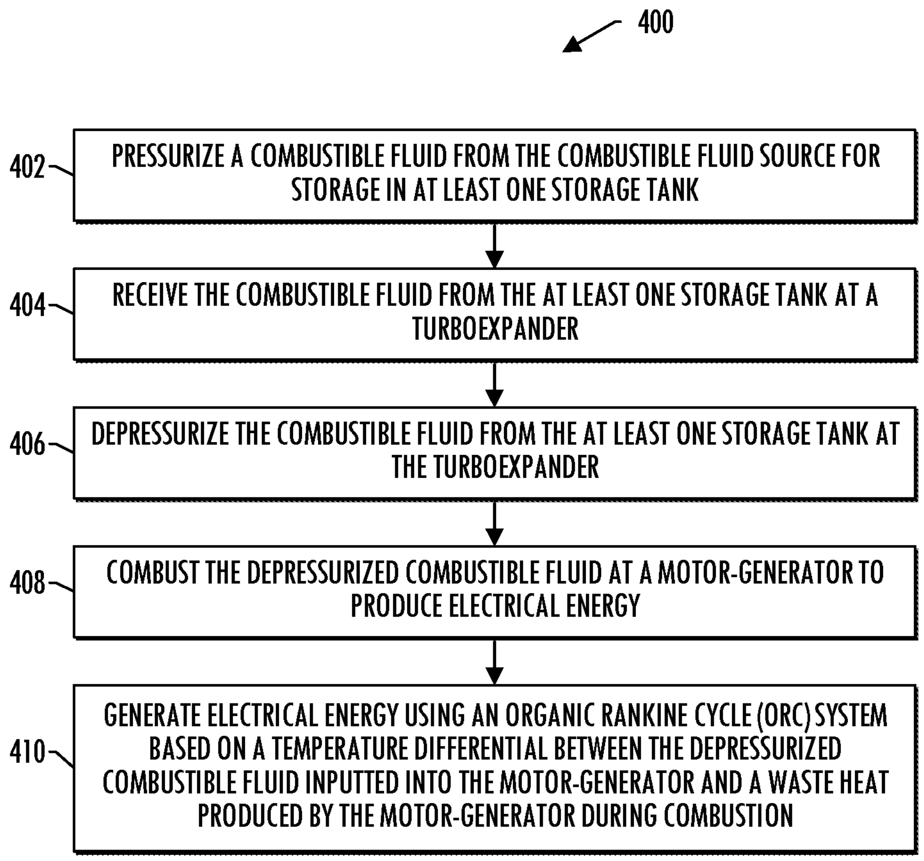
FIGS. 4A, 4B, 4C, 4D, 4E, 4F, 4G, 4H, 4I, 4J, 4K, and 4L are flowcharts illustrating various operations in a method of generating energy, according to some example implementations.
Figure 4B:

In some examples, pressurizing the combustion fluid at block 402 further includes pressurizing the combustion fluid from the combustible fluid source that includes a landfill or a digester, as shown at block 412 of FIG. 4B.

Figure 4C:

In some examples, the method 400 further includes moving the combustible fluid from the combustible fluid source to the at least one storage tank using a pump, as shown at block 414 of FIG. 4C.

Figure 4D:
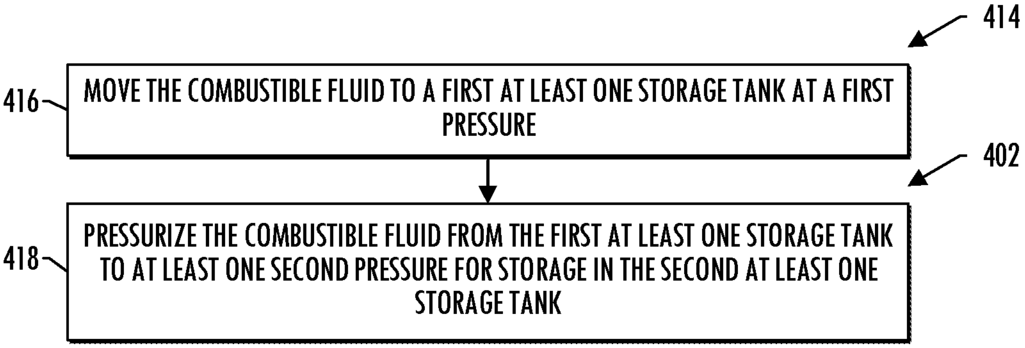

In some examples, the at least one storage tank is a second at least one storage tank, and moving the combustible fluid at block 414 further includes moving the combustible fluid to a first at least one storage tank at a first pressure, as shown at block 416 of FIG. 4D. In some of these examples, pressurizing the combustible fluid at block 402 further includes pressurizing the combustible fluid from the first at least one storage tank to at least one second pressure for storage in the second at least one storage tank, as shown at block 418.

Figure 4E:
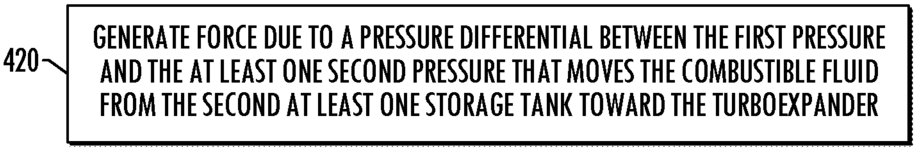

In some examples, the method 400 further includes generating force due to a pressure differential between the first pressure and the at least one second pressure that moves the combustible fluid from the second at least one storage tank toward the turboexpander, as shown at block 420 of FIG. 4E.

Figure 4F:
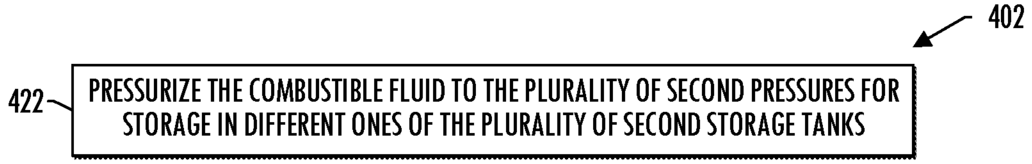

In some examples, the at least one second storage tank is a plurality of second storage tanks, the at least one second pressure is a plurality of second pressures, and pressurizing the combustible fluid at block 402 further includes pressurizing the combustible fluid to the plurality of second pressures for storage in different ones of the plurality of second storage tanks, as shown at block 422 of FIG. 4F.

Figure 4G:
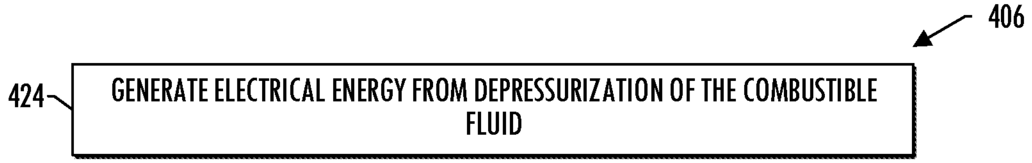

In some examples, depressurizing the combustible fluid at block 406 further includes generating electrical energy from depressurization of the combustible fluid, as shown at block 424 of FIG. 4G.

Figure 4H:
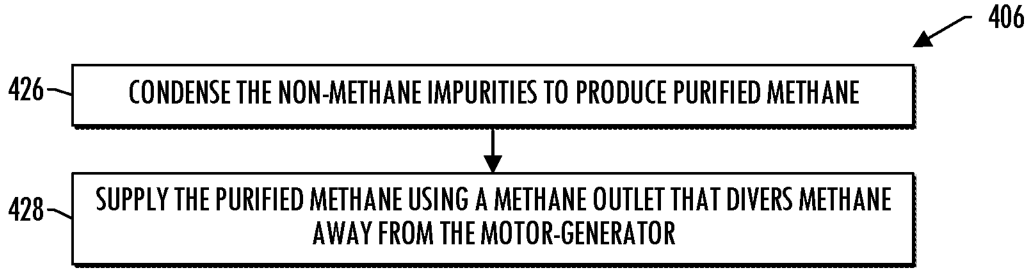

In some examples, the combustible fluid includes biomethane including methane and non-methane impurities, and depressurizing the combustible fluid at block 406 further includes condensing the non-methane impurities to produce purified methane, as shown at block 426 of FIG. 4H. In some of these examples, the method further includes supplying the purified methane using a methane outlet that divers methane away from the motor-generator, as shown at block 428.

Figure 4I:
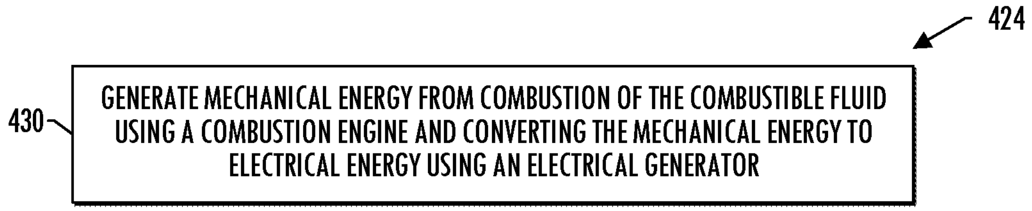

In some examples, combusting the combustible fluid at block 424 further includes generating mechanical energy from combustion of the combustible fluid using a combustion engine and converting the mechanical energy to electrical energy using an electrical generator, as shown at block 430 of FIG. 4I.

Figure 4J:
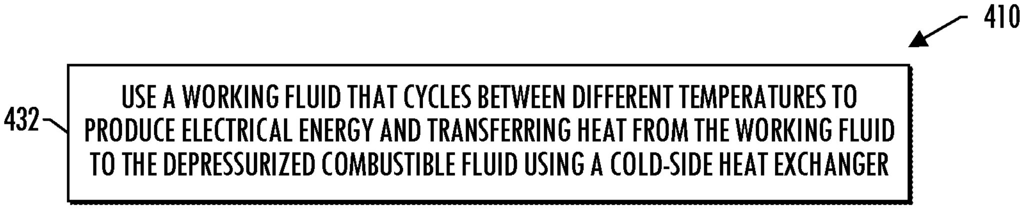

In some examples, generating electrical energy using the ORC system at block 410 further includes using a working fluid that cycles between different temperatures to produce electrical energy and transferring heat from the working fluid to the depressurized combustible fluid using a cold-side heat exchanger, as shown at block 432 of FIG. 4J.

Figure 4K:
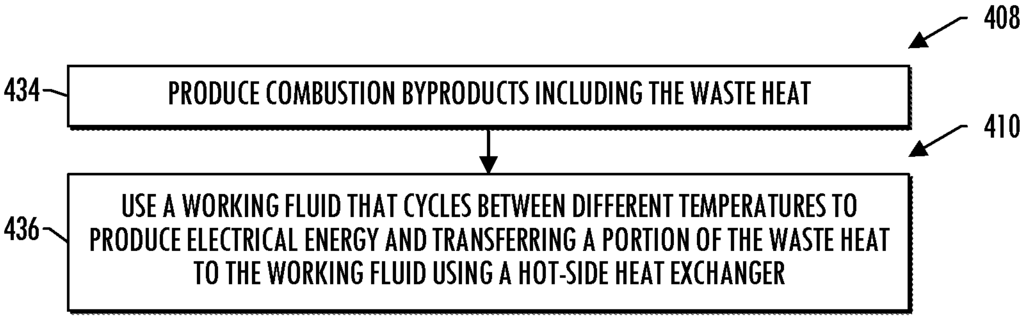

In some examples, combusting the depressurized combustible fluid at block 408 further includes producing combustion byproducts including the waste heat, as shown at block 434 of FIG. 4K. In some of these examples, generating electrical energy using the ORC system at block 410 further includes using a working fluid that cycles between different temperatures to produce electrical energy and transferring a portion of the waste heat to the working fluid using a hot-side heat exchanger, as shown at block 436.

Figure 4L:
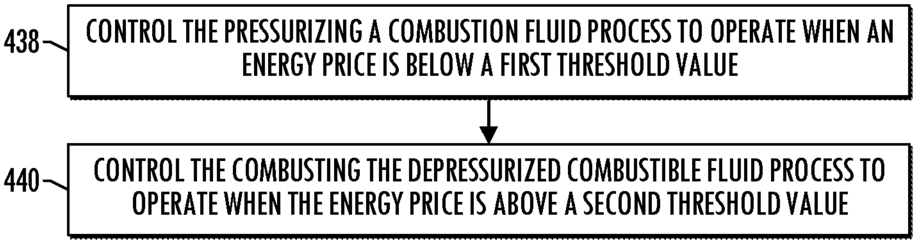

In some examples, the method 400 further includes controlling the pressurizing a combustion fluid process to operate when an energy price is below a first threshold value, as shown at block 438 of FIG. 4L. In some of these examples, the method also includes controlling the combusting the depressurized combustible fluid process to operate when the energy price is above a second threshold value, as shown at block 440. In some examples, the energy price is a price of electricity or natural gas. In some examples, the first threshold value is different from the second threshold value.

As explained above and reiterated below, the present disclosure includes, without limitation, the following example implementations.

Clause 1. An energy generation system comprising: a fluid storage system including a compressor and at least one storage tank, the compressor configured to pressurize a combustible fluid from a combustible fluid source for storage in the one or more storage tanks; and an energy recovery system configured to receive the combustible fluid from the at least one storage tank, the energy recovery system including: a turboexpander configured to depressurize the combustible fluid received from the at least one storage tank; a motor-generator configured to input the combustible fluid as depressurized by the turboexpander, and generate electrical energy from the combustible fluid; and an organic Rankine cycle (ORC) system configured to generate electrical energy based on a temperature differential between the combustible fluid input to the motor-generator and a waste heat produced by the motor-generator.

Clause 2. The energy generation system of clause 1, wherein the compressor is configured to pressurize the combustible fluid from the combustible fluid source that includes a landfill or a digester.

Clause 3. The energy generation system of clause 1 or clause 2, further comprising: a pump configured to move the combustible fluid from the combustible fluid source to the fluid storage system.

Clause 4. The energy generation system of clause 3, wherein the at least one storage tank is a second at least one storage tank, and the fluid storage system further includes a first at least one storage tank, and wherein the pump is configured to move the combustible fluid to the fluid storage system for storage in the first at least one storage tank at a first pressure, and the compressor is configured to pressurize the combustible fluid from the first at least one storage tank to at least one second pressure for storage in the second at least one storage tank.

Clause 5. The energy generation system of clause 4, wherein a pressure differential between the first pressure and the at least one second pressure causes movement of the combustible fluid from the second at least one storage tank toward the energy recovery system.

Clause 6. The energy generation system of clause 4 or clause 5, wherein the at least one second storage tank is a plurality of second storage tanks, the at least one second pressure is a plurality of second pressures, and the compressor is configured to pressurize the combustible fluid to the plurality of second pressures for storage in different ones of the plurality of second storage tanks.

Clause 7. The energy generation system of any of clauses 1 to 6, wherein the turboexpander is configured to generate electrical energy from depressurization of the combustible fluid.

Clause 8. The energy generation system of any of clauses 1 to 7, wherein the combustible fluid includes bio-methane including methane and non-methane impurities, and the turboexpander is further configured to cool the bio-methane and condense the non-methane impurities and thereby produce purified methane, and the energy generation system further includes a methane outlet coupled to the energy recovery system configured to divert the purified methane away from the motor-generator.

Clause 9. The energy generation system of any of clauses 1 to 8, wherein the motor-generator includes a combustion engine configured to generate mechanical energy from combustion of the combustible fluid, and an electrical generator configured to convert the mechanical energy to electrical energy.

Clause 10. The energy generation system of any of clauses 1 to 9, wherein the ORC system is configured to use a working fluid that cycles between different temperatures to produce electrical energy, and the energy generation system further includes a cold-side heat exchanger configured to transfer heat from the working fluid to the combustible fluid input to the motor-generator.

Clause 11. The energy generation system of any of clauses 1 to 10, wherein the motor-generator is configured to combust the combustible fluid from which combustion byproducts including the waste heat are produced, and wherein the ORC system is configured to use a working fluid that cycles between different temperatures to produce electrical energy, and the energy generation system further includes an exhaust flue configured to direct the combustion byproducts from the motor-generator, and a hot-side heat exchanger configured to transfer a portion of the waste heat from the exhaust flue to the working fluid.

Clause 12. The energy generation system of any of clauses 1 to 11, further comprising control circuitry configured to control the fluid storage system in storage of the combustible fluid when an energy price is below a first threshold value, and control the energy recovery system in generation of the electrical energy when the energy price is above a second threshold value.

Clause 13. The energy generation system of clause 12, wherein the energy price is a price of electricity or natural gas.

Clause 14. The energy generation system of clause 12 or clause 13, wherein the first threshold value is different from the second threshold value.

Clause 15. A method of generating energy from a combustible fluid source, the method comprising: pressurizing a combustible fluid from the combustible fluid source for storage in at least one storage tank; receiving the combustible fluid from the at least one storage tank at a turboexpander; depressurizing the combustible fluid from the at least one storage tank at the turboexpander; combusting the depressurized combustible fluid at a motor-generator to produce electrical energy; and generating electrical energy using an organic Rankine cycle (ORC) system based on a temperature differential between the depressurized combustible fluid inputted into the motor-generator and a waste heat produced by the motor-generator during combustion.

Clause 16. The method of clause 15, wherein pressurizing the combustion fluid further includes pressurizing the combustion fluid from the combustible fluid source that includes a landfill or a digester.

Clause 17. The method of clause 15 or clause 16, further comprising: moving the combustible fluid from the combustible fluid source to the at least one storage tank using a pump.

Clause 18. The method of clause 17, wherein the at least one storage tank is a second at least one storage tank, and moving the combustible fluid further includes moving the combustible fluid to a first at least one storage tank at a first pressure, and pressurizing the combustible fluid further includes pressurizing the combustible fluid from the first at least one storage tank to at least one second pressure for storage in the second at least one storage tank.

Clause 19. The method of clause 18, further comprising generating force due to a pressure differential between the first pressure and the at least one second pressure that moves the combustible fluid from the second at least one storage tank toward the turboexpander.

Clause 20. The method of clause 18 or clause 19, wherein the at least one second storage tank is a plurality of second storage tanks, the at least one second pressure is a plurality of second pressures, and pressurizing the combustible fluid further includes pressurizing the combustible fluid to the plurality of second pressures for storage in different ones of the plurality of second storage tanks.

Clause 21. The method of any of clauses 15 to 20, wherein depressurizing the combustible fluid further includes generating electrical energy from depressurization of the combustible fluid.

Clause 22. The method of any of clauses 15 to 21, wherein the combustible fluid includes bio-methane including methane and non-methane impurities, and depressurizing the combustible fluid further includes condensing the non-methane impurities to produce purified methane, and the method further comprises: supplying the purified methane using a methane outlet that divers methane away from the motor-generator.

Clause 23. The method of any of clauses 15 to 22, wherein combusting the combustible fluid further includes generating mechanical energy from combustion of the combustible fluid using a combustion engine and converting the mechanical energy to electrical energy using an electrical generator.

Clause 24. The method of any of clauses 15 to 23, wherein generating electrical energy using the ORC system further includes using a working fluid that cycles between different temperatures to produce electrical energy and transferring heat from the working fluid to the depressurized combustible fluid using a cold-side heat exchanger.

Clause 25. The method of any of clauses 15 to 24, wherein combusting the depressurized combustible fluid further includes producing combustion byproducts including the waste heat, and generating electrical energy using the ORC system further includes using a working fluid that cycles between different temperatures to produce electrical energy and transferring a portion of the waste heat to the working fluid using a hot-side heat exchanger.

Clause 26. The method of any of clauses 15 to 25, further comprising: controlling the pressurizing a combustion fluid process to operate when an energy price is below a first threshold value, and controlling the combusting the depressurized combustible fluid process to operate when the energy price is above a second threshold value.

Clause 27. The method of clause 26, wherein the energy price is a price of electricity or natural gas.

Clause 28. The method of clause 26 or clause 27, wherein the first threshold value is different from the second threshold value.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An energy generation system comprising:

a fluid storage system configured to store a combustible fluid at a first pressure and first temperature, the fluid storage system comprising one or more storage tanks for storing the combustible fluid at the first pressure and first temperature, the one or more storage tanks configured to receive the combustible fluid from a compressor configured to pressurize the combustible fluid from a combustible fluid source for storage in the one or more storage tanks; and an energy recovery system configured to receive the combustible fluid from the one or more storage tanks via an expander and a heat exchanger, wherein the received combustible fluid is at a second pressure that is lower than the first pressure and a second temperature that is lower than the first temperature, the energy recovery system configured to generate energy from the received combustible fluid by causing the combustion of the received combustible fluid at a motor-generator to generate a first electrical energy and waste heat, and by generating a second electrical energy using an organic Rankine cycle (ORC) based on a temperature differential between the waste heat and the received combustible fluid; and control circuitry coupled to the fluid storage system and the energy recovery system, the control circuitry configured to:

determine a relative price of the combustible fluid and the electrical energy; and produce a combustible fluid output when a price of the combustible fluid is greater than a price of the electrical energy by routing the combustible fluid away from the motor-generator.

2. The energy generation system of claim 1, wherein the expander is a turboexpander configured to:

receive the combustible fluid from the fluid storage system; and depressurize the received combustible fluid and generate a third electrical energy from depressurization of the combustible fluid.

3. The energy generation system of claim 2, wherein the turboexpander comprises an expansion turbine configured to utilize the combustible fluid received from the fluid storage system to rotate a turbine shaft, the turbine shaft coupled to an electrical generator operable to convert a rotational motion of the turbine shaft to electrical energy.

4. The energy generation system of claim 1, wherein the control circuitry is configured to:

control the expander to remove impurities and produce a purified combustible fluid; and actuate one or more valves to cause the purified combustible fluid to be routed to a fluid outlet and away from the motor-generator, when the price of the combustible fluid is greater than the price of the electrical energy.

5. The energy generation system of claim 1, wherein the expander removes impurities.

6. The energy generation system of claim 1, wherein the heat exchanger is downstream from the expander.

7. The energy generation system of claim 1, wherein the heat exchanger is further configured to transfer heat between the combustible fluid and a working fluid.

8. The energy generation system of claim 1, wherein the expander is configured to cool the combustible fluid to the second temperature.

9. The energy generation system of claim 8, wherein the heat exchanger is configured to receive the combustible fluid having the second temperature from the expander and heat the combustible fluid to a third temperature.

10. The energy generation system of claim 1, wherein the motor-generator includes a combustion engine configured to generate mechanical energy from combustion of the received combustible fluid and an electrical generator configured to convert the mechanical energy to the first electrical energy.

11. The energy generation system of claim 1, wherein the control circuitry is configured to receive the price of the combustible fluid and the price of the electrical energy from a network connection that regularly publishes energy pricing information.

* * * * *